Figure 1:
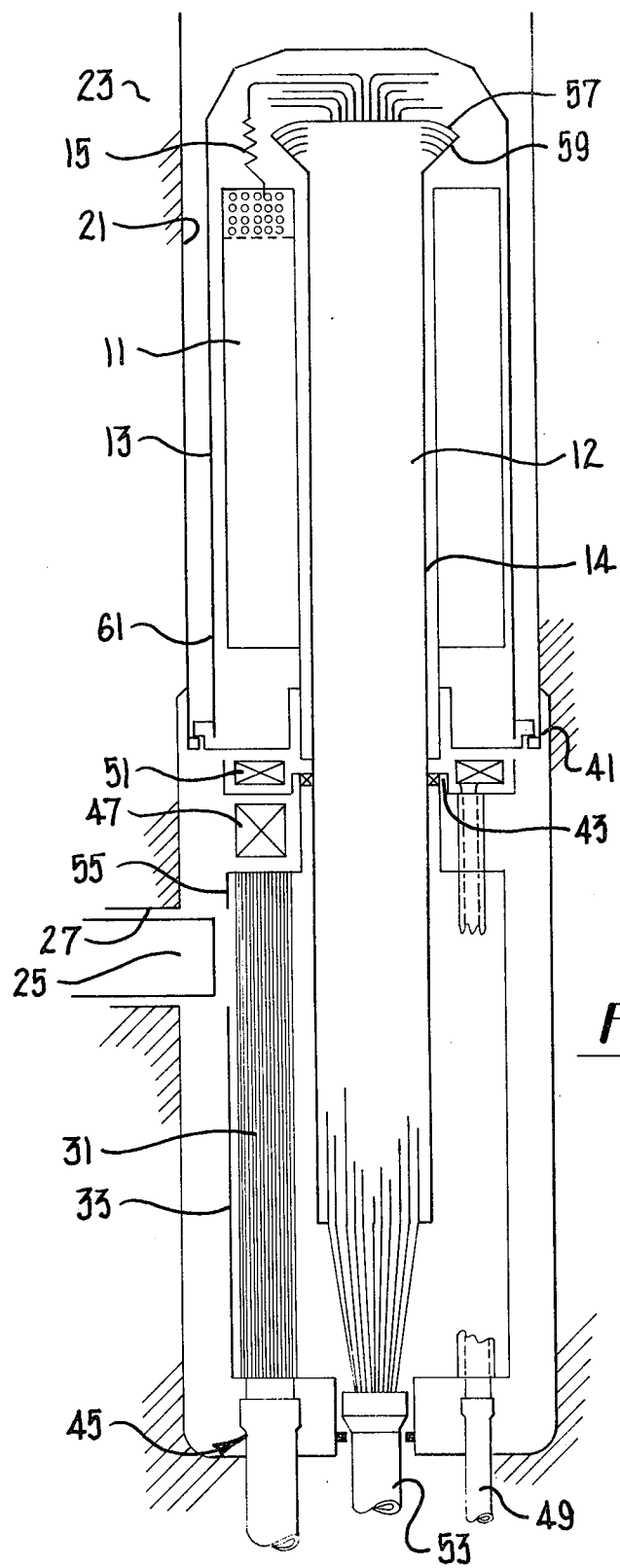

United States Patent [19]

Lockett

[11] 4,005,681

[45] Feb. 1, 1977

[54] VAPOR GENERATOR

[75] Inventor: George E. Lockett, La Jolla, Calif.

[73] Assignee: General Atomic Company, San Diego, Calif.

[22] Filed: July 23, 1975

[21] Appl. No.: 598,321

[52] U.S. Cl. .............................. 122/32; 122/510; 165/82; 165/162

[51] Int. Cl.² ...................... F22B 1/06; F22B 37/24

[58] Field of Search ............. 165/81, 82, 162, 163; 122/32, 34, 510

[56] References Cited

UNITED STATES PATENTS

| | | | |
|---|---|---|---|
| 3,126,949 | 3/1964 | Boni, Jr. et al. ............... | 165/163 X |
| 3,247,897 | 4/1966 | Ammon .............................. | 165/81 |
| 3,361,118 | 1/1968 | Breckenridge et al. ........... | 122/510 |
| 3,575,236 | 4/1971 | Romanos ........................... | 165/162 |
| 3,822,933 | 5/1975 | Kube ................................. | 165/163 |

Primary Examiner—Kenneth W. Sprague
Attorney, Agent, or Firm—Fitch, Even, Tabin & Luedeka

[57] ABSTRACT

A vapor generator is described wherein a lever system is utilized to move helical connecting tubes communicating between two tube bundles subject to thermal expansion of different amounts. The lever system is actuated by thermal expansion of different amounts of two different structural elements within the vapor generator.

7 Claims, 2 Drawing Figures

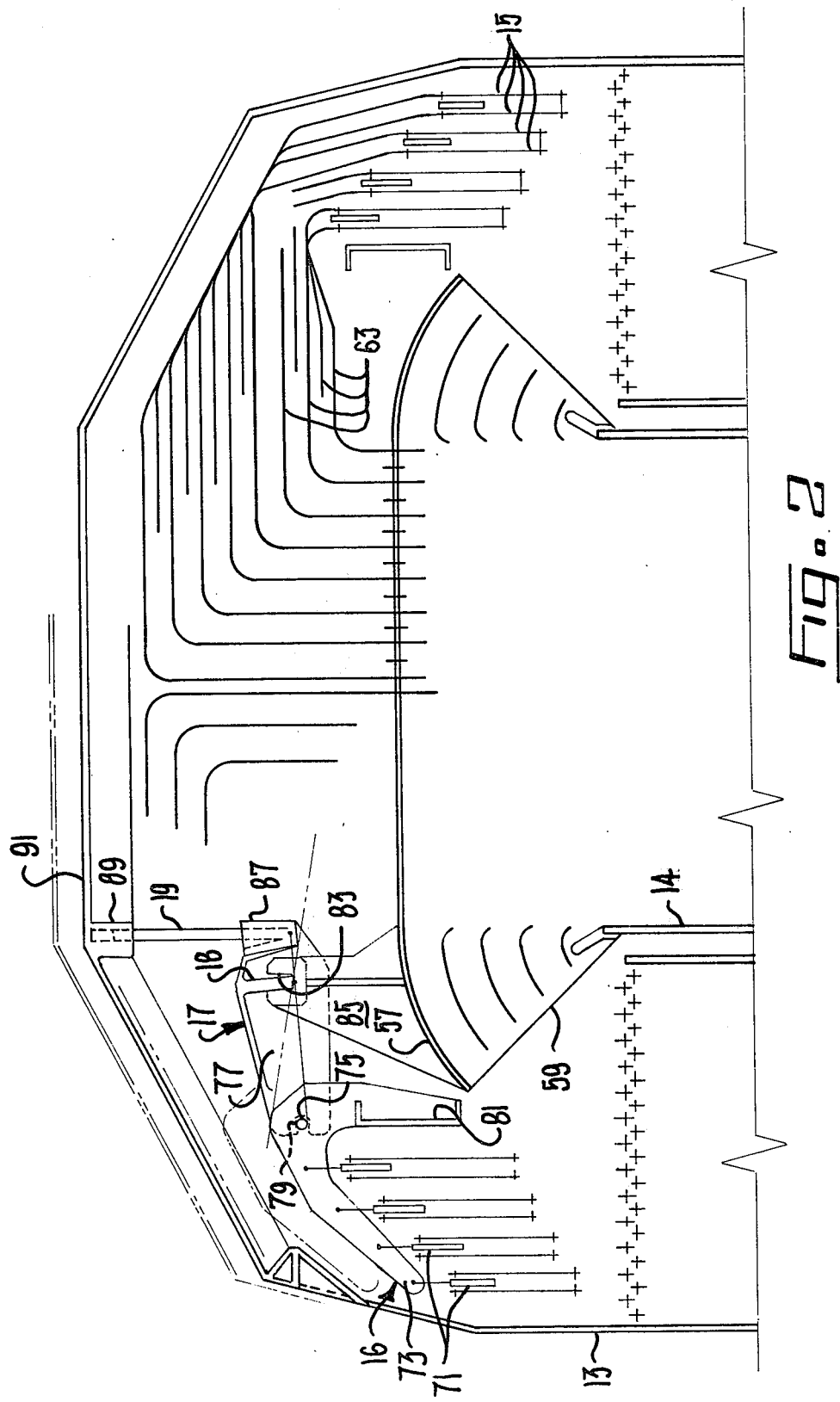

VAPOR GENERATOR

This invention relates generally to vapor generators and, more particularly, to an improved vapor generator in which provision is made for accommodating thermal expansion of different amounts between interconnected tube bundles.

Certain types of vapor generators employ tube bundles in which the tubes are of different configurations or different lengths, or are subjected to different temperatures. Under such circumstances, thermal expansion of the individual tube bundles between different operating conditions or between the shutdown condition and the operating condition may be substantially different. Where the tube bundles are interconnected, such thermal expansion of different amounts may produce relatively high stresses on the interconnecting tubes.

In many vapor generator designs, the necessity for accommodating thermal expansion of different amounts has resulted in the use of interconnecting coils of helical shape. The stresses resulting from thermal expansions of different amounts are applied to the interconnecting tubes as torsion loading. Because the whole of the material volume in the tube is in the most highly stressed area, the greatest deflection is possible for a given stress value and material volume.

Although the use of helical connecting tubes in some situations may be easily achieved, other vapor generator design configurations may take the employment of helical interconnecting tubes difficult. For example, where tube bundles are side by side or are nested coaxially, some section of the interconnecting tubes must necessarily extend transversely of the direction of thermal expansion. High stresses resulting from thermal expansion of different amounts may be difficult to accommodate in the horizontal sections of the interconnecting tubes.

It is an object of the present invention to provide an improved vapor generator.

Another object of the invention is to provide an improved vapor generator wherein thermal expansion of different amounts between interconnected tube bundles is readily accommodated.

A further object of the invention is to provide a vapor generator having interconnected tube bundles subject to thermal expansion of different amounts wherein stresses on the interconnecting tubes as a result of such different thermal expansion are minimized.

Other objects of the invention will become apparent to those skilled in the art from the following description, taken in connection with the accompanying drawings wherein:

FIG. 1 is a schematic side view of a vapor generator constructed in accordance with the invention; and FIG. 2 is a schematic view, substantially enlarged, of the upper portion of the vapor generator of FIG. 1.

Very generally, the vapor generator of the invention comprises first and second tube bundles 11 and 12 subject to thermal expansion of different amounts. First and second structural elements, 13 and 14, are also subject to thermal expansions of different amounts. A plurality of helical connecting tubes 15 communicate between the tubes in the first tube bundle and the tubes in the second tube bundle. Support means 16 engage the upper portions of the helical connecting tubes for suspending the tubes on a substantially vertical axis. Lever means 17 are secured to the support means and have fulcrum means 18. Actuating means 19 engage the lever means on the opposite side of the fulcrum means from the support means. The actuating means and the fulcrum means are secured, respectively, to the first and second structural elements and are positioned on the lever means to provide movement of the support means for accommodating the different thermal expansions of the first and second tube bundles.

Referring now more particularly to FIG. 1, the schematic diagram therein is that of a steam generator such as may be employed in a nuclear reactor. The generator is mounted within a well 21 formed in the prestressed concrete reactor pressure vessel 23 for the reactor core, not shown. Hot gas is supplied to the steam generator through a conduit 25 positioned in a duct 27 of the reactor vessel 23. The gas circulates through the steam generator and passes upwardly thereof to a gas circulator positioned in the well 21 above the steam generator. The gas circulator then returns the gas to the reactor core through suitable ducting, not shown.

The illustrated steam generator includes banks or bundles 31 of reheater tubes positioned toward the lower end of a well 21 and framed by suitable housing 33 of metal plates or the like. Positioned above the reheater tube bundle in axial alignment therewith is a bundle of helical coils nested together to form an annular shape and comprising the annular bundle 11. The bundle 11 is provided with a housing 13 of metal plates or the like. The bundle 11 comprises the economizer-evaporator and first superheater section of the steam generator.

The second superheater section is the tube bundle 12 comprised of a plurality of elongated straight tubes which are positioned in the space defined by both the tube bundles 31 and the annular tube handle 11. The housing 14, comprised of suitable metallic plates or the like, is formed surrounding the tube bundle 12. The housings 13 and 14 are suitably supported by a mounting flange 41 mounted within the well 21 by suitable means, not shown. Differential thermal expansion between the housing 14 and the lower housing 33 is accommodated by an annular sliding seal indicated at 43.

Hot and cold reheater fluids are supplied to and exit from the reheat tube bundles 31 by suitable headers 45. The hot reheat and cold reheat tubes of the reheater tube bank are interconnected by hairpin shaped crossover tubes indicated generally at 47.

Feed water for the steam generator illustrated is supplied through a feed water input conduit 49 which passes upwardly through the lower portion of the steam generator and connects with the tubes in the tube bundle 11 through expansion leads 51. Outflow at the top of the tube bundle 11 passes to the upper end of the tube bundle 12 as will be explained in detail subsequently. Superheated steam exits the lower end of the tube bundle 12 through the superheater header 53.

Incoming hot gas from the reactor core enters the penetration through the duct 27 and conduit 25 and passes through an opening 55 in the housing 33 for the reheat tube bundles 31. After circulating over the tubes in the bundles 31, the gas enters the open lower end of the housing 14 and passes upwardly over the tubes in the tube bundle 12. A gas flow deflection plate 57 is mounted at the upper end of the housing 14 by a plurality of vertical fins 59. The gas passes through the space between the upper open end of the housing 14 and the plate 57 between the fins 59 and is then directed downwardly over the helical tubes in the tube bundle 11. After passing over the helical tubes in the tube bundle 11, the gas passes through ports 61 in the outer wall of the housing 13 and passes upwardly between the housing 13 and the wall of the penetration 21 to the gas circulator, not shown.

In the illustrated steam generator, there are twice as many straight tubes in the tube bundle 12 as there are helical tubes in the tube bundle 11. Accordingly, each of the connecting tubes which pass the steam from the superheater portion of the tube bundle 11 to the superheater bundle 12 is divided or bifurcated. To this end, the horizontal portions of the connecting tubes 63 are bifurcated as shown schematically in FIG. 2. The horizontal portions 63 are joined to the upper ends of the helical tubes in the bundle 11 by the helical connecting tubes 15.

The helical connecting tubes 15 are nested together and lie therefore in an annular assembly. By appropriately grading the diameters, the tubes 15 can be nested coaxially within each other. The helical sections are not rigidly tied to a support and therefore are free to deflect, loading the tubes torsionally. Thus, the ability to expand and contract axially enables the helical tubes to accommodate some of the differences as a result of thermal expansion of different amounts of the tubes in the tube bundle 11 relative to the tubes in the tube bundle 12.

Because the tube portions 63 are not of sufficient cantilever strength to lift the coils 15 to their proper position without excessive or overstressed deflection, additional support for the helical connecting tubes 15 is desirable. Where such support is rigidly carried by gas deflector plate 57 at the upper end of the housing 14 a reduced movement would be applied to coils 15 and an increased movement would be applied to the horizontal portions of connecting tubes 63. To achieve sufficient flexibility required suitable coiling to satisfy a permissible stress value and a substantial increase in height would be required to accommodate the added coiling. In accordance with the invention, the upper ends of the helical connecting coils 15 are moved an appropriate amount to match variation in dimensions as a result of thermal expansion of different amounts by the tubes in the tube bundles 11 and 12.

As may be seen in FIG. 2, the upper end of each helical connecting tube 15 is supported by support means 16. The support means 16 include a plurality of hanger rings 71 which depend from a plurality of carrier arms 73. The carrier arms 73 are secured to each other to maintain a circumferentially spaced relationship by an annular channel beam 81. The hanger rings 71 are pivotally hung from the carrier arms and each upper coil rests on a hanger ring. Several carrier arms are disposed at circumferentially spaced intervals, for example six is a suitable number, around the upper region of the steam generator. Thus, the hanger rings and the upper portion of the coils are supported uniformly and the coils hang downwardly therefrom and free to expand and contract axially.

As previously mentioned, the support means 16 are secured to the lever means 17. More particularly, each of the carrier arms 73 is attached by a pivot pin 75 to one end of a lever 77. The pin 75 passes through a slot 79 in the end of the lever.

The fulcrum means 18 comprise a downward projection on each of the levers 77 which seats in a groove 83 formed in a support bracket 85. The support bracket 85, in turn, is attached to the deflection plate 57 which forms part of the housing 14 as a result of its attachment thereto by the fins 59. A plurality of levers 77 and fulcrum means 18 are provided, each associated with a respective one of the carrier arms 73.

The end of each of the levers 77 opposite the slot 79 is provided with an integral cup 87 which receives the lower end of the actuating means 19. As illustrated, the actuating means 19 consist of a plurality of rods 19, one for each of the levers 77 which are retained in an internally threaded boss 89 formed in the upper cap 91 for the housing 13.

In the illustrated steam generator, because of the proportions generally shown in the drawings, not only do the tubes in the tube bundle 12 expand more in axial length than the tubes in the tube bundle 11, but the inner housing 14 expands more than the outer housing 13. Accordingly, the cap 91 and the deflection plate 57 will move more closely together at the limits of expansion relatively to their more contracted state. This depresses the end of the lever engaged by the rods 19, raising the carrier arms 73 and thus raising the hanger rings 71. This raises the upper ends of the helical connecting tubes 15 and thus expands the coils thereof axially.

By selecting the proper ratio of the distance between the fulcrum of the levers 77 and the rods 19 to the distance between the fulcrums of the levers and the pins 75, a proper lever action may be chosen to raise the helical tubes 15 the necessary amount to accommodate the difference in expansion between the tube bundles 11 and 12, and at the same time minimize the stress placed upon the horizontal connecting portions 63. The system is driven by the expansion in structural elements created by temperature and thus responds automatically and proportionally. The various stresses are carried by members which can be designed to readily accommodate the loads applied and the smaller horizontal tube sections 63 are substantially unloaded. In order to spread the overall duty, it may be desirable to provide some deflection of the horizontal portions as well so that all stresses are kept as low as possible in proportion to what can be accommodated.

By way of example, a steam generator design may have a potential expansion of over 6 inches whereas the tube bundle 11 may only expand a little over 3 inches. Under such circumstances, the plate 57 and the cap 91 may move closer together by about three-quarters of an inch which will produce slightly over one inch at the lever. Using a lever ratio of slightly under three to one, the levers may be designed to raise the hangers 71 about 3 inches. This will readily accommodate differential thermal expansions present without unduly loading the tubes.

It may be seen therefore that the vapor generator of the invention readily accommodates its differences in thermal expansion without placing undue stress on any of the elements but rather by spreading the stress among the various elements in proportion to their ability to withstand it. The system operates automatically, requires no external sensing or power sources for movement, and is relatively low cost and easy to install.

Various modifications of the invention in addition to those shown and described herein will become apparent to those skilled in the art from the foregoing description and accompanying drawings. Such modifications are intended to fall within the scope of the appended claims.

What is claimed is:

1. In a vapor generator having first and second tube bundles subject to thermal expansion of different amounts, and having first and second structural elements also subject to thermal expansion of different amounts, a plurality of substantially helical connecting tubes communicating between the tubes in said first tube bundle and the tubes in said second bundle, support means engaging the upper portions of said helical connecting tubes for suspending said tubes on a substantially vertical axis, lever means secured to said support means, said lever means having fulcrum means displaced from said support means, actuating means engaging said lever means on the opposite side of said fulcrum means from said support means, said actuating means and said fulcrum means being secured, respectively, to said first and second structural elements and being positioned on said lever means to provide movement of said support means for accommodating the different thermal expansions of said first and second tube bundles.

2. Apparatus according to claim 1 wherein said first tube bundle comprises a plurality of substantially straight tubes, and wherein said second tube bundle comprises a plurality of substantially helical tubes having convolutions about said first tube bundle.

3. Apparatus according to claim 1 wherein said first structural element comprises a housing for said first tube bundle, and wherein said second structural element comprises a housing for said second tube bundle.

4. Apparatus according to claim 1 wherein said support means include an annular frame, wherein said lever means are pivotally attached thereto, and wherein said support means further include a plurality of hangers extending therefrom to engage the upper portions of said helical connecting tubes.

5. A vapor generator comprising, a first tube bundle having a plurality of substantially straight tubes, a second tube bundle having a plurality of substantially helical tubes having convolutions about said first tube bundle, a first housing for said first tube bundle, a second housing for said second tube bundle, a plurality of helical connecting tubes communicating between the tubes in said first tube bundle and the tubes in said second tube bundle, support means engaging the upper portions of said helical connecting tubes for suspending said tubes on a substantially vertical axis, lever means secured to said support means, said lever means having fulcrum means, actuating means engaging said lever means on the opposite side of said fulcrum means from said support means, said actuating means being mounted on said first housing, said fulcrum means being mounted on said second housing, said actuating means and said fulcrum means being positioned relative to said support means to provide movement of said support means for accommodating the differential thermal expansions of said first and second tube bundles as a result of the different thermal expansions of said first and second housings.

6. A vapor generator according to claim 5 wherein said lever means comprise a plurality of levers extending radially with respect to the axis of said second tube bundle spaced at circumferential intervals.

7. A vapor generator according to claim 5 wherein said first and second tube bundles each comprise a superheater section of said vapor generator.

* * * * *